United States Patent
Park et al.

(10) Patent No.: US 11,605,098 B1
(45) Date of Patent: Mar. 14, 2023

(54) GENERATION OF QUALITY SCORES FOR BRAND CURATION

(71) Applicant: Amazon Technologies, Inc., Seattle, WA (US)

(72) Inventors: Taejin Park, Bellevue, WA (US); Thiago Schiavo Mosqueiro, Seattle, WA (US); Matthew Taddy, Seattle, WA (US); William Lee Gans, Seattle, WA (US); Crystal Hoyer, Seattle, WA (US); Ramon Huerta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 84 days.

(21) Appl. No.: 16/784,164

(22) Filed: Feb. 6, 2020

(51) Int. Cl.
*G06Q 30/02* (2012.01)
*G06F 16/2457* (2019.01)
*G06N 7/00* (2023.01)
*G06N 20/00* (2019.01)

(52) U.S. Cl.
CPC ....... *G06Q 30/02* (2013.01); *G06F 16/24578* (2019.01); *G06N 7/005* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,002,832 B1 * | 4/2015 | Patel | G06F 16/35 707/723 |
| 10,354,262 B1 * | 7/2019 | Hershey | H04L 67/535 |
| 2013/0138533 A1 * | 5/2013 | Vartanian | G06Q 30/06 705/26.35 |
| 2016/0110788 A1 * | 4/2016 | Stephenson | G06Q 30/0613 705/7.29 |
| 2017/0004513 A1 * | 1/2017 | Vadakattu | G06F 16/24578 |
| 2018/0308159 A1 * | 10/2018 | Knijnik | G06N 20/20 |

* cited by examiner

*Primary Examiner* — Arif Ullah
(74) *Attorney, Agent, or Firm* — Eversheds Sutherland (US) LLP

(57) ABSTRACT

Technologies are provided for generation of quality scores for brand curation. A quality score represents a quality assessment of a brand. To generate quality scores, a machine-learning (ML) model can be trained to classify brands as either pertaining or not-pertaining to a group of select brands. The ML model can be trained using the group of select brands as a training set and performance signals for those brands as feature inputs. A select brand can be an expert curated brand, a brand carried by a particular merchant, or a brand identified using social media. A performance signal defines a value of a quality metric of a brand, where the quality metric defines an aspect of interaction between a customer and the brand within a digital marketplace. A quality score of a brand can be generated by applying the trained ML model to performance signals for the brand.

20 Claims, 7 Drawing Sheets

GENERATION OF QUALITY SCORES FOR BRAND CURATION

BACKGROUND

Curation of products refers to the process of selection, organization, and presentation of those products. Curation is generally accomplished using expert knowledge. Adequate curation of products for a marketplace can result in high traffic and generally satisfactory customer experience.

In some digital marketplaces, a large catalog of products is desirable and can be reasonably curated. A vast selection of products, however, can complicate a search for particular products in such digital marketplaces. For example, it can be difficult to discern amongst products from different brands, let alone identify new high-quality brands. Those issues can be exacerbated as products from lesser known brands from various selling partners in new geographies are added to the catalog.

Further, curation of lesser known brands from new regions becomes difficult because it can demand greater scope of domain expert knowledge. Such a demand can render the curation less scalable as the number of product increases. Even if curation of those product is successfully accomplished, some of the brands of the curated products may be less recognizable to customers. As a consequence, the discovery of quality brands still may be hindered and customer experience may be lessened.

Curation also becomes difficult in situations in which real estate for presentation or storage of curated items is limited. In those situations, curation of items that fail to yield a reasonable amount of traffic can be detrimental, if not catastrophic, to a marketplace or exhibit that carries the curated items.

Therefore, several technical challenges remain in technologies for the curation of brands. Improved technologies that address those challenges may be desired.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

Figure 1:
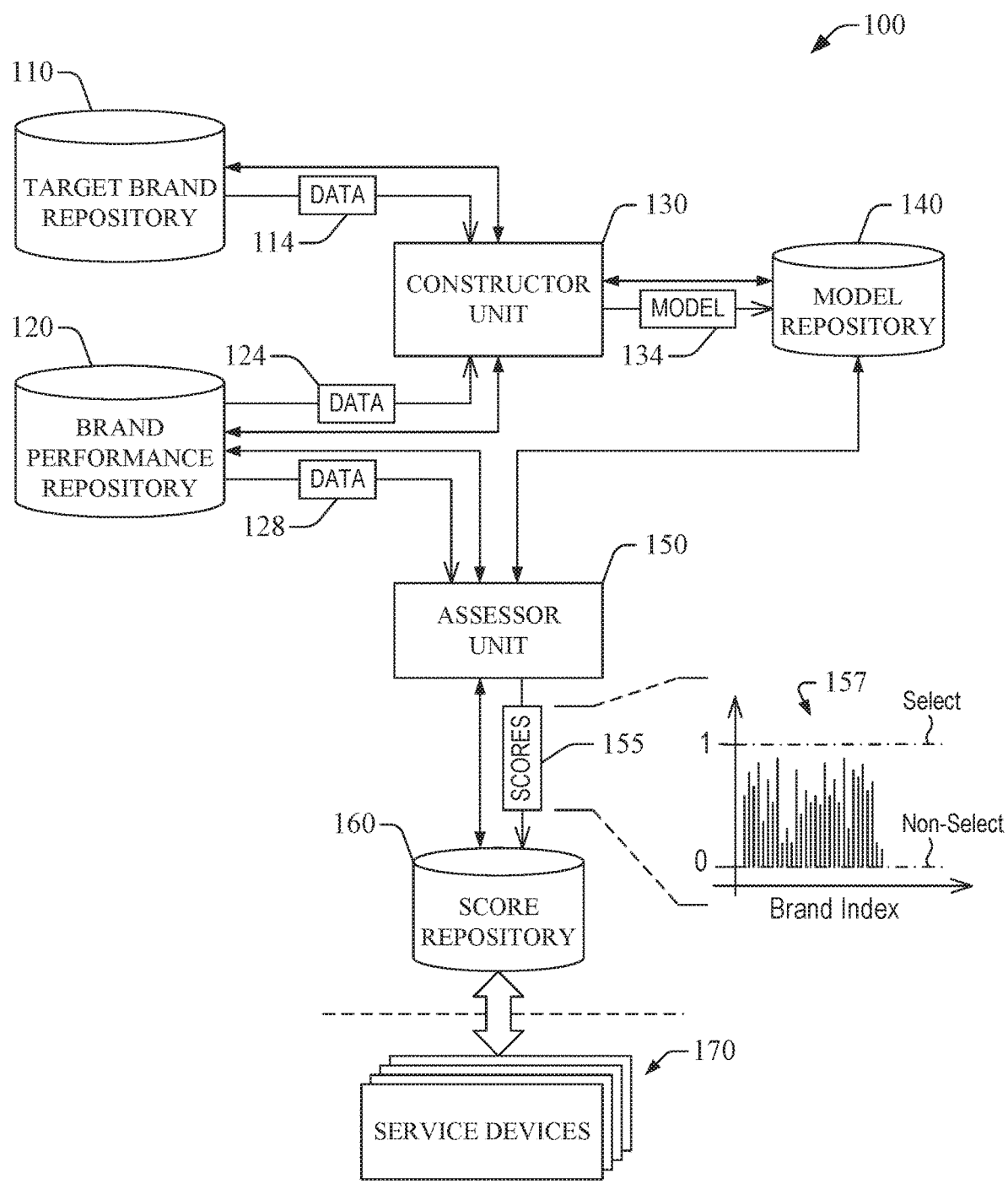
FIG. 1 illustrates an example of an operational environment for generation of quality scores for brand curation, in accordance with one or more embodiments of this disclosure.

The disclosure recognizes and addresses, amongst other technical challenges, the issue of brand curation. While the selection provided by large catalogs of products or other items appeals to end-users, commonplace domain expert curation for those catalogs may fail to capture brands or items with lesser name recognition but that would otherwise appeal to end-users. Commonplace domain expert curation also lacks scalability, particularly for those large catalogs having brands or items from different geographic regions and/or merchants of multiple sizes. The disclosure provides technologies for brand curation that can evaluate a myriad of brand types and is scalable.

Embodiments of the disclosed technologies, individually or in combination, can be used for generation of quality scores for brand curation. A quality score represents a quality assessment of a brand relative to select brands. The select brands can include expert curated brands, brands carried by a particular merchant, or brands identified using posts in a social media platform. Regardless of manner of selection, each one of the select brands is deemed a high-quality brand. The quality score can define a probability of the brand to be included in the list of selected brands and, thus, to be classified or otherwise identified as a high-quality brand.

To generate quality scores, a machine-learning (ML) model can be configured to generate a probability that a brand pertains to a list of select brands. In other words, the ML model can determine a probability that a brand would be assessed or otherwise identified as a high-quality brand. The ML model can be trained using the list of select brands as a training set and performance signals for the select brands as feature inputs. A performance signal defines a value of a quality metric of a brand, where the quality metric defines an aspect of interaction between a customer and the brand within a digital marketplace. Examples of the quality metric include repeat customer ratio, brand review rating, and branded impression count. Other example of metrics that may be utilized to train such an ML model include sale amounts by brand, sale revenues by brand, or similar brand-specific quantities. Those metrics, however, are not utilized in some embodiments of the disclosed technologies because data defining values of those metrics may be scarce, for example. Such a situation may arise for relatively newer brands in a catalog of brands.

Thus, a trained ML model has optimized parameters that map the group of performance signals to the human-curated brands. As a result, the trained ML model weights the various performance signals used as feature inputs in order to predict brands that would have been selected by a human curator for inclusion in the list of select brands.

A trained ML model can then be applied to performance signals for a particular brand in order to generate a quality score for that brand. The particular brand can be included in a catalog of the digital marketplace originating the feature inputs utilized during training. In other instances, the particular brand can be included in a catalog of another digital marketplace.

Quality scores generated in accordance with this disclosure constitute a data signal that can be incorporated into numerous other applications. For example, the quality scores can be utilized for search ranking or other ordering algorithms; advertising; inventory planning; a combination thereof; or similar.

By combining (a) data defining brands selected externally to a digital marketplace and (b) rich, large datasets of quality metrics for those select brands, the ML models of this disclosure can capture factors that determine brand appeal. Thus, the ML models can be readily applied to mining for high-quality brands within a vast catalog of products, without human intervention. This type of mining can continue to be applied as the scope of the catalog of products expands, providing a type of scalability that is difficult (if not plain unfeasible) to attain with traditional curation approaches. This type of mining also can identify high-quality brands exhibiting a degree of brand diversity that is difficult to attain with conventional technologies. Such a diversity can enable discovery of high-quality brands that would be difficult to unveil using traditional curation approaches.

With reference to the drawings, FIG. 1 illustrates an example of an operational environment 100 for generation of quality scores for brand curation, in accordance with one or more embodiments of this disclosure. The operational environment 100 includes a target brand repository 110 that retains data identifying select brands. The data retained in the target brand repository 110 can originate from a source that is external to a digital marketplace. One or several of those select brands can be identified by domain expert curators and, thus, can be referred to as expert curated brands. In addition, or as an alternative, one or several of those select brands can be identified by monitoring brands of products carried by a specific merchant within a digital marketplace. Such a merchant can operate externally to the digital marketplace.

Accordingly, by being curated by a domain expert or otherwise vetted for inclusion in a catalog of a reputable merchant, those select brands can be deemed high-quality brands. In addition, the specific brands can reflect favorable customer perception. The select brands can serve as a reference for other brands for which a quality assessment has yet to be made. The select brands can be referred to as target brands.

Figure 2:
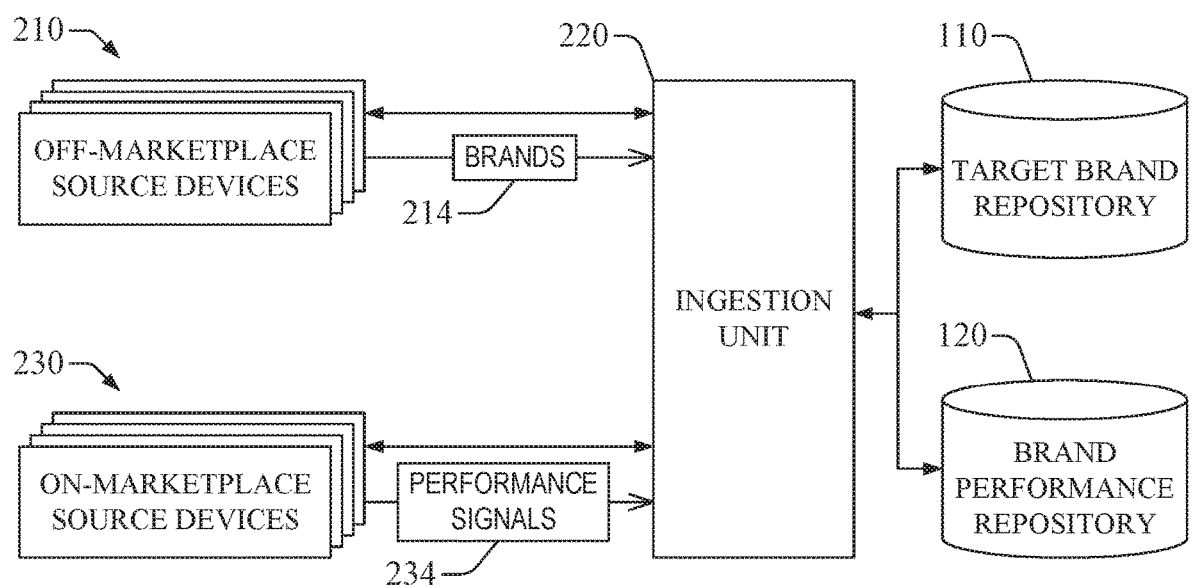
FIG. 2 illustrates an example of an operational environment for acquisition of data for generation of quality scores for brand curation, in accordance with one or more embodiments of this disclosure. The data can include first data defining brands for inclusion in a training set, and second data defining performance signals corresponding to quality metrics.

In some embodiments, as is illustrated in FIG. 2, the operational environment 100 can include an ingestion unit 220 functionally coupled to source devices 210. Such devices can be external to the digital marketplace and, thus, can be referred to as off-marketplace source devices. The source devices 210 can identify target brands either by means of expert curation or by monitoring product offers by a particular merchant. The ingestion unit 220 can data 214 (labeled as brands 214 simply for the sake of nomenclature) defining a group of target brands.

With further reference to FIG. 1, the operational environment 100 also includes a second repository 120 that retains data characterizing quality metrics for brands that are present in a digital marketplace. The quality metrics can include, for example, a combination of branded impression factor, return ratio, repeat customer ratio, brand preference scores, revenue per glance view, brand review rating, brand review rating weighted by revenue, or brand registration indicator. Such a combination, however, may not include metrics representing sale amounts by brand, sale revenues by brand, or similar, when data defining values of those quality metrics may be scarce. Simply for the purposes of illustration, the foregoing quality metrics are described below.

Branded impression factor refers to count of searches with brand intentions returning product identifiers (PIDs) from that same brand among the first several search results (e.g., the first 20 results). For purposes of illustration, a product identifier can be embodied in an alphanumeric code/parameter or another type of datum that uniquely identifies a product within a digital marketplace. Examples of searches with brand intention are "A_Brand" and "A_Brand shoes." Branded impression factor is a proxy to a measure of brand popularity. Return ratio is a ratio of purchases that were subsequently returned in the time range. Merchandise returns are accounted in the determination of the return ratio regardless of the reason for returning a product. Reasons to return a product can include, for example, product defects, exclusions from a packet within a wardrobe program, and the like. Repeat customer ratio is a ratio of customers that purchased different products from a particular brand on multiple instances.

Brand preference score is an estimated likelihood/probability of a customer preferring a given brand against its competitors, when factors such as price and search ranking are controlled. Revenue per glance view is the revenue generated by all PIDs of each brand divided by the total number of glance views in a digital marketplace.

Brand review rating includes average of review ratings for a brand and standard deviation of the review ratings. The average is determined across all PIDs for the brand. Brand review rating weighted by revenue includes average of review ratings for a brand and standard deviation of the review ratings, both the average and the standard deviation weighted by the revenue of each PID for the brand.

In some instances, brand registration indicator can be a binary flag that identifies a brand as either enrolled or non-enrolled in a brand registry of a digital marketplace that carries the brand. Brands may be required to satisfy particular conditions in order to be eligible for inclusion in the brand registry. Having a valid trademark registration is an example of such conditions.

It is further noted that the disclosed technologies need not rely exclusively on the foregoing quality metrics. Additional metrics can be included in the group of quality metrics. An example of those additional or alternative metrics includes time spent perusing a product of a particular brand. For instance, the product can be perused by accessing images corresponding to different views of the product. Longer perusal time intervals can be indicative of greater interest in the product and, thus, the brand. Another example includes recency of a particular review rating (e.g., top rating or second-top rating) where the recency can be indicated by a number of days since the particular review rating was provided.

Data defining values of a quality metric constitute a performance signal. As mentioned, the quality metric is specific to a brand. Thus, because the brand can be associated with several product categories, a performance signal can include data across those product categories. In other configurations, the performance signal can include data corresponding to a defined product category. For purposes of illustration, a product category can be one of home; office; kitchen; health and personal care; pet care; beauty; toys; sporting goods; apparel; home improvement; wireless product; consumer electronics; grocery; or similar.

In some embodiments, the ingestion unit 220 (FIG. 2) is functionally coupled to source devices 230. In contrast to the source devices 210, the source devices 230 can be internal to the digital marketplace. Thus, the source devices 230 can be referred to as on-marketplace source devices. The source devices 230 can generate performance data defining values of various quality metrics. The ingestion unit 220 can acquire performance signals 234 from the source devices 230. The performance signals 234 can be acquired periodically or according to another type of schedule. As a result, the performance data retained in the brand performance repository 120 is updated accordingly.

With further reference to FIG. 1, a group of defined performance signals for defined target brands can be used to generate a model to determine a probability that a brand would be assessed as a high-quality brand according to the defined target brands. In other words, the model can determine the likelihood that a brand would be included in a human-curated list of brands. The probability determined by the model defines a quality score SB that represents an assessment of quality of the brand (designated with a B). The score SB can have a value in the range from 0 to 1. The larger the value of the score SB, the higher the quality of the brand B.

To generate such a model, the operational environment 100 also includes a constructor unit 130 that can generate a machine-learning (ML) model using multiple feature inputs, each feature input corresponding to a specific performance signal corresponding to a quality metric. Generating the ML model includes training a binary classification model using a group of target brands as a training set and the multiple feature inputs for the group of target brands.

To that end, the constructor unit 130 can receive data 114 identifying the group of target brands from the target brand repository 110. The constructor unit 130 also can receive data 124 defining each one of the multiple feature inputs for brands in the group of target brands. The data 124 can be received from the brand performance repository 120. Using the received data, the constructor unit 130 can determine a solution to an optimization problem with respect to a prediction error function. The solution results in model parameters that minimize the prediction error function. The model parameters define a trained model 135. The constructor unit 130 can retain the trained model 135 in a model repository 140.

After an ML model has been configured and trained, an assessor unit 150 included in the operational environment 100 can apply the trained ML model to assess quality of a group of brands. Applying the trained ML model includes accessing the trained ML model. In one configuration, the trained ML model can be obtained directly from the model repository 140. In another configuration, the trained ML model can be accessed by means of an API or another type of program code. The API or that programming code can be provided by the constructor unit 130 or another component (not depicted in FIG. 1) functionally coupled to the constructor unit 130 and/or the model repository 140.

The group of brands being assessed can be included within the digital marketplace in which the performance signals utilized during training are generated. To assess the quality of the group of brands, the assessor unit 150 can receive performance data 128 defining performance signals for the group of brands. Those performance signals are the same type of performance signals used as feature inputs in the training of the ML model. Thus, the performance signals defined by the performance data 128 can include, amongst other features, branded impression factor, return ratio, and repeat customer ratio. In some embodiments, the group of brands can be specific to a customer or customer type. Thus, the group of brands can be determined using attribute data defining one or several customer attributes that characterize the customer or customer type. In those embodiments, the assessor unit 150 can receive the attribute data (not depicted in FIG. 1) and can then determine the group of brands using the attribute data. As an example, when the customer type indicated by the attribute data corresponds to a high-earner demographic segment, the group of brands can include luxury brands and/or specialty brands. As another example, when the customer type indicated by the attribute data corresponds to an early-adopter demographic segment, the group of brands can include one or several brands of high-technology goods. As yet another example, when the customer type indicated by the attribute data corresponds to an environment-conscious demographic segment, the group of brands can include one or several brands from entities engaged in sustainable production practices (manufacturing practices, farming practices, fishing practices, etc.). After the group of brands is determined, the performance data 128 received by the assessor unit 150 can be specific to the group of brands.

The assessor unit 150 can then generate respective quality scores 155 for the group of brands by applying the trained ML model to the performance data 128. As mentioned, the scores 155 range from 0 to 1, where a score equal to 0 indicates a non-select brand and a score equal to 1 indicates a select brand. In other words, again, a score that is equal to 0 denotes a brand that, when analyzed according to the curation criteria utilized to define a training set of target brands, the brand would be excluded from such a set. In turn, a score that is equal to 1 denotes a brand that would be included in a set having target brands. As is illustrated in diagram 157 in FIG. 1, each brand can have a brand index (e.g., a natural number) and an associated score. In one example, a score that exceeds a defined threshold can represent a select brand. For instance, the defined threshold can be 0.8 or 0.9. In one case, the assessor unit 150 can apply the trained ML model (e.g., model 134) to all brands present in a catalog of the digital market place. The assessor unit 150 can retain the quality scores 155 in a score repository 160.

It is noted that a brand can have products in different categories. For example, an apparel product and a beauty product can be branded under a same brand. For such a brand, first performance signals corresponding to the apparel category and second performance signals corresponding to the beauty category can represent different customer behaviors. Those categories can thus be treated as different brands within a group of target brands.

In some embodiments, the data 124 can define target brands within a specific product category, such as apparel, beauty, watches, office, or similar. In addition, the data 128 can define performance signals corresponding to feature inputs within that specific product category, for the target brands. The constructor unit 130 can then generate an ML model 134 for the specific category. Such an ML model 134 can be applied to performance signals corresponding to feature inputs for other brands that have products in the specific product category. As a result, quality scores for the specific product category, for those brands, can be generated.

Another ML model 134 can be trained for a second specific product category. Namely, the constructor unit 130 can receive data 124 defining target brands within the second specific product category. The constructor unit 130 also can receive data 128 defining performance signals corresponding to feature inputs within the second product category, for the target brands. The constructor unit 130 can then generate an ML model 134 for the second specific category.

The foregoing approach can be iterated for other product categories to train several respective ML models for the other product categories. Quality scores for those product categories can be generated using respective trained ML models and suitable performance signals. Such quality scores can be aggregated in order to determine a single quality score across product categories for that particular brand. In one instance, the quality scores can be aggregated by determining an arithmetic average of the quality scores. In another instance, the quality scores can be aggregated by determining a weighted average of the quality scores, where each quality score can be weighted using a value of a defined performance metric (e.g., branded impression count) for the product category corresponding to the quality score. The aggregated scores can be consistent globally while remaining optimized for each product category.

Quality scores generated using a trained ML model in accordance with aspects of this disclosure can be utilized in a service platform that can leverage brand quality as a parameter for decision making within a service. For example, the quality scores can be utilized for search ranking or other filtering or ordering algorithms; match relevance; advertisement; a combination thereof; or similar. The service platform can be external to an architecture that generates the quality scores. A dashed line in FIG. 1 schematically depicts a boundary between such an architecture and the service platform.

Service devices 170 constitute such a service platform. In some instances, at least one of the service devices 170 can access the score repository 160 to obtain quality scores. The score repository 160 can be accessed via an interface unit (not shown in FIG. 1) within the architecture. The interface unit can send the quality scores to the at least one of the service devices 170. In other instances, rather than obtaining quality scores from the score repository 160, at least one of the service devices 170 can request one or several quality scores from the assessor unit 150 at a time of, or in preparation to, providing a service. In other words, the assessor unit 150 can generate a quality score in response to a request from one or several of the service devices 170 as part of providing the service. In some configurations, quality scores can be requested by executing a function call of an application programming interface (API). The API can be provided by assessor unit 150 or the interface unit that permits access to the repository 160, for example.

As an example, the service platform can provide a search service. Quality scores generated using a trained ML model in accordance with aspects of this disclosure can be utilized as input in a search ranking algorithm. When a search query (e.g., blue jeans) is received, the search service can determine search results to present. To that end, the search service can determine a solution to a matching problem, where the solution can identify content items that match the search query (e.g., blue jeans). The search service can then determine a solution to a ranking problem in order to determine an arrangement for presentation of the content items. The quality scores can be utilized to generate a ranking of the content items, for example. Content items having higher quality scores can be presented before content items having lower quality scores. In addition, or in some instances, prominence of a content item in a layout of the content items can be determined using, at least partially, a quality score of a brand corresponding to the content item. The prominence of the content item can refer to features of an area assigned to content item in a user interface (UI) where the content item is presented. Prominence of the content item can refer to a specific combination of size of the area, shape of the area, color of the area, and presence of particular font type and/or size utilized within the area corresponding to the content item.

Training a ranking model for search ranking can rely on both brands that customers have bought and brands that have a satisfactory quality score. For example, brands that have a satisfactory score are brands that may be involved in future activity (viewing of an advertisement, click-through actions, a purchase, etc.).

As another example, a service platform that administers directed content can present directed content corresponding to low-quality brands with less prominence than other directed content corresponding to high-quality brands. In some instances, directed content corresponding to brands having a quality score below a score threshold may be excluded for presentation in an outlet channel administered by the service platform. Here, directed content refers, for example, to digital media configured for a particular audience and/or a particular outlet channel, such as a website, a streaming service, or a mobile application. Directed content can include, for example, any type of digital media, such as advertisement; motion pictures, animations, or other types of video segments; video games; podcasts; audio segments of defined durations (ringtones, songs, etc.); and the like.

As another example, a service platform can cause presentation of an indicator of quality of a brand (e.g., "good brand" or "high-quality brand") in conjunction with presentation of directed content or a search result. The indicator can be a visual element presented in a display device, or an audio element presented by an audio device.

The ML models disclosed herein need not be static. Because data retained in the brand performance repository 120 can be updated routinely (e.g., weekly or biweekly) the data 124 utilized to generate the ML model 134 can be updated accordingly. The constructor unit 130 can then generate an updated version of the ML model 134 using updated instances of the data 124. As a result, quality scores generated using the ML model 134 also can be updated routinely in order to reflect up-to-date opinions and perceptions of end-users of a digital marketplace.

Trained ML models can be validated in response to various changes. For example, a trained ML model can be validated in response to changes in performance signals. The trained ML model can be applied to a set of updated performance signals not utilized during training of the ML model. To validate the trained ML mode, resulting quality scores can be analyzed to determine if the trained ML model continues to classify target brands as expert curated brands or otherwise select brands. In instances in which the trained ML predicts a low quality score for a target brand when using the set of updated performance signals, that target brand can be evaluated.

The trained ML model also can be validated by analyzing ranking metrics based at least partially on quality scores resulting from applying the trained model to the set of updated performance signals. Search results obtained using a ranking algorithm that leverages the quality scores can be compared to various metrics to ensure that the brands that customers are acquiring continue to be represented.

A trained ML that results from an update to a list of target brands or input features, or both, also can be validated as is explained above.

Because the ML model 134 is trained using performance signals generated in a particular digital marketplace, the ML model 134 can be validated using performance signals for a catalog of brands within another digital marketplace. The particular digital marketplace can include brands specific to a first geographic region and the other digital marketplace can include brands specific to a second geographic region different from the first geographic region. For example, the first region can span the United States of America and the second region can span the European Union or a portion of South America. Performance of the ML model 134 can be evaluated by determining a number of brands having quality scores that exceed a defined threshold. Those brands are referred to as "higher-quality" brands. The quality scores are generated by applying the ML model 134 to the performance signals for the brands specific to the second geographic region. The evaluation of the ML model 134 also includes determining a proportion of that number of higher-quality brands that also is present in a catalog of a specific merchant in the second geographic region. A larger defined threshold can result in a smaller proportion of higher-quality brands being present in the catalog of the specific merchant.

The higher such a proportion is, the greater the portability of the ML model 134 across geographic boundaries. Here, portability refers to the degree to which the ML model 134 can be utilized reliably in geographic region different from the geographic region relied upon for the training of the ML model 134. Portability can be an indicator of performance of the ML model 134. When fully portable, each one of the higher-quality brands predicted by the ML model 134 is included in the catalog of the specific merchant.

Performance of a trained ML model generated in accordance with this disclosure can be systematically refined by improving performance signals (standard) or target brands (not conventional), or both, that are utilized to train the ML model. Various approaches can be utilized to improve performance of an ML model. One of those approaches can include improving performance signals. Another one of those approaches can include improving the scope of target brands constitutes a distinct approach from those routinely applied in conventional technologies.

For example, the portability of a trained ML model can be improved by modifying a group of target brands. Modifying the group of targets brands can modify the ML problem (e.g., binary classification task) to be optimized during training in a manner that yields a trained ML model having improved portability.

Modifying a group of target brands by adding brands specific to a product category or specific to a target audience, or both, can change the scope of the training set to cover a more complete set of factors that define a high-quality brand. As a result, a ML model trained using the modified group of target brands can predict high-quality brands that would not be contemplated by an end-user of a digital marketplace, for example.

As an illustration, a ML model can be trained using a group of target brands that includes only luxury brands carried by a particular merchant. Application of such an ML to performance signals corresponding to a particular catalog can predict accurately the quality of brands in the catalog that are perceived according to a set of perception factors similar to those of the luxury brands in the group of target brands. In other words, the ML model would predict well those brands in the catalog that are similar to luxury brands. Therefore, the group of target brands can be improved by adding other types of brands carried by merchants that target other consumer segments besides premium customers.

As another illustration, an original group of target brands that includes brands carried by merchants in the sports apparel space can be modified by adding fashion brands. Because the added fashion brands can have different performance than the brands included in the original group of target brands, training an ML model using the modified group of brands can result in a more precise mapping between performance signals and target brands. Consequently, the classification performance of an ML model trained using the modified group of brands can be greater than that of an ML model trained using the original group of brands.

The disclosed technologies can leverage other forms of human selection of brands besides domain expert curation. Crowdsourcing is an example of those other forms. For example, digital content posted in a social media platform can be utilized to identify target brands. In some instances, particular metadata posted concurrently with the digital content can be utilized to identify social media posts associated with a brand, for example.

Figure 3:
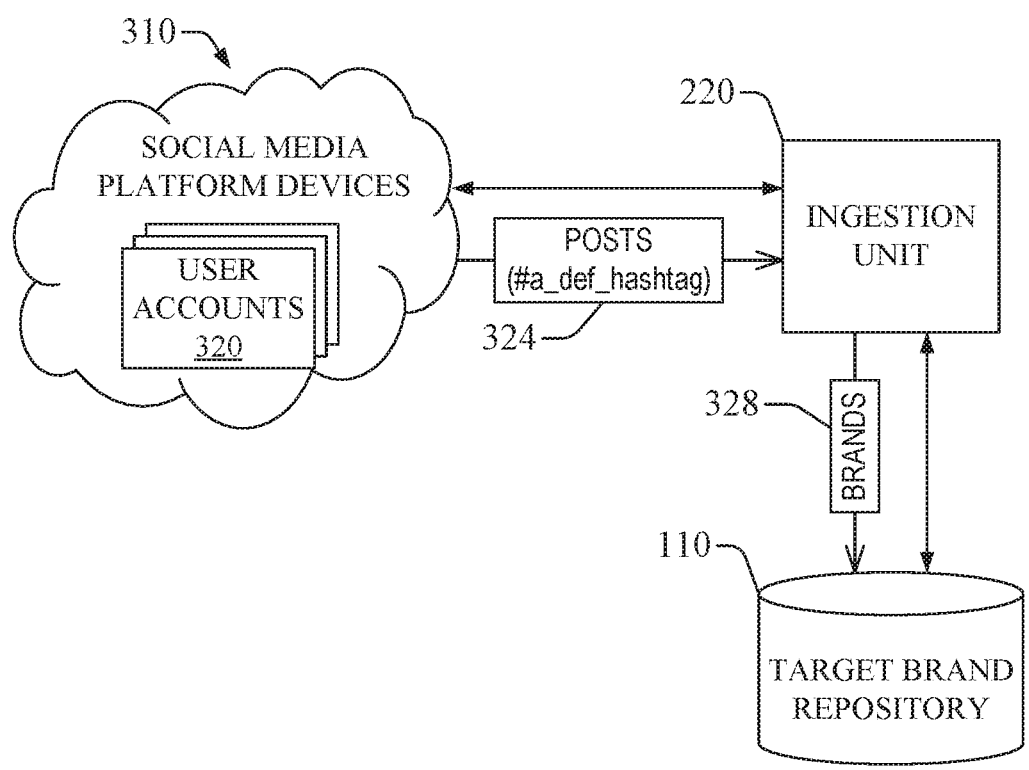
FIG. 3 illustrates another example of an operational environment for acquisition of data for generation of quality scores for brand curation, in accordance with one or more embodiments of this disclosure. The data can be representative of target brands for inclusion in a training set.

In some embodiments, as is illustrated in the operational environment 300 shown in FIG. 3, the ingestion unit 220 can be functionally coupled to social media platform devices 310. The social media platform devices 310 can constitute a social media platform. The social media platform device 310 are an example of at least some of the off-marketplace source devices 210. The ingestion unit 220 can monitor digital content posted on the social media platform. Some digital content can be posted publicly. Digital content posted privately also can be monitored. Private digital content can pertain to specific user accounts 320 in the social media platform. The user accounts 320 can be configured to permit the monitoring of digital content for the sake of identifying target brands. In some embodiments, the user accounts 320 can include accounts that can influence public perception of a brand. As such, the user accounts 320 can include social media influencer accounts, trendsetter accounts, public personality accounts, a combination of those types of accounts, or similar.

In one configuration, the ingestion unit 220 can connect to the social media platform to monitor hashtag activity (either public activity or private activity) or publication activity, or both, corresponding to the user accounts 320. Here, publication activity refers to the generation of social media posts for presentation within a feed corresponding to a user account in the social media platform. Hashtag activity refers to the incorporation of one or several hashtags in social media posts within such a feed. Connecting to the social media platform can include executing program code that accesses digital content exposed by the social media platform. The digital content can include one or several hashtags. As an example, the ingestion unit 220 can query at least one the social media platform devices 310 for social media posts having a particular hashtag, such as #founditonamazon. To access posts within the social media platform, the ingestion unit 220 can execute program code in order to identify a particular post from posts in the social media platform. The particular post can include the particular hashtag or can be any type of post (e.g., an original post or a shared post) corresponding to a user account in the social media platform. As an illustration, such a program code can be a script, such as a crawler component using APIs. Regardless of the mechanisms utilized to connect to the social media platform, the ingestion unit 220 complies with terms of use of the social media platform and only monitors permissible hashtag activity or permissible types of social media posts, or both. In some instances, the ingestion unit 220 can register with the social media platform prior to connecting and monitoring hashtag activity.

In response, in some instances, the ingestion unit 220 can receive social media posts 324 that include the particular hashtag (labeled as "#a_def_hashtag" in FIG. 3). In addition, or in other instances, the social media posts 324 that are received need not include the particular hashtag. Each one of the social media posts 324 can include digital content. The ingestion unit 220 can then analyze the digital content received in the social media posts 324 to determine if a brand is referred to in the digital content. As part of the analysis, the ingestion unit 220 can detect one or several keywords identifying respective brands by performing image analysis or audio analysis, or both. As an illustration, the image analysis can utilize optical character recognition (OCR) techniques, and the audio analysis can utilize keyword spotting techniques. In addition, or in some embodiments, the ingestion unit 220 can implement other forms of natural language analysis to determine that a post of the social media posts 324 refers to a particular brand.

Brand data identifying brands detected in the social media posts 324 can be analyzed to select a group of brands that satisfy one or several selection criteria. Such a selection can result in second brand data that identifies a group of target brands. The ingestion unit 220 can retain data 328 defining select brands in the target brand repository 110.

Figure 4:
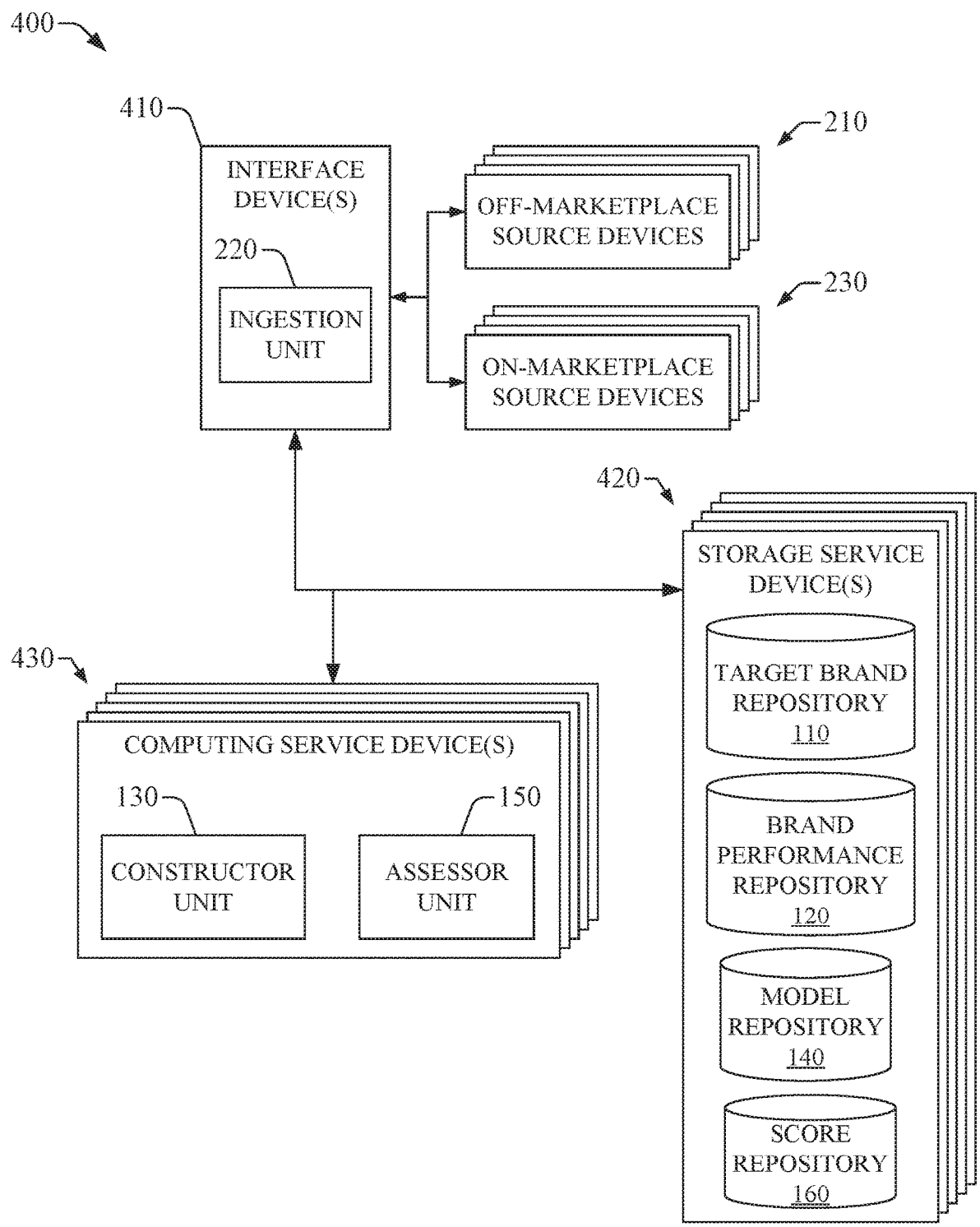
FIG. 4 illustrates an example of a computing system for generation of quality scores for brand curation, in accordance with one or more embodiments of this disclosure.

FIG. 4 is a schematic block diagram of an example of a computing system 400 for generation of quality scores for brand curation, in accordance with one or more embodiments of this disclosure. The computing system 400 can acquire target data defining target brands. As mentioned, the target brands are deemed high-quality brands and can serve as curated brands relative to other brands for which a quality assessment has yet to be made. To that end, the example computing system 400 includes one or many interface devices 410 functionally coupled to the off-marketplace source devices 210. The interface device(s) 410 can receive the target data from at least one of the off-marketplace source devices 210.

The computing system 400 also can acquire performance data defining values of a group of quality metrics for a brand. As is discussed above, the performance data constitutes performance signals for the brand that serve as feature inputs in a ML model (e.g., model 134). Thus, at least one of the interface device(s) 410 can be functionally coupled to the on-marketplace source devices 230. The at least one of the interface device(s) 410 can receive performance signals for the group of quality metrics, for several brands from at least one of the on-marketplace source devices 230.

At least one of the interface device(s) 410 can include the ingestion unit 220 to acquire target data and performance signals in accordance with aspects described herein. In some embodiments, the ingestion unit 220 can be embodied in a computer-executable module. The interface device(s) 410 can include one or many memory devices that can retain the computer-executable module, and one or many processors functionally coupled to memory device(s). At least one of the processor(s) can execute the computer-executable module to acquire the target data and the performance signals. In one configuration, the computer-executable module can include an API and/or another type of program code that can permit receiving the target data via a function call, for example.

At least one of the interface device(s) 410 can send the target data and the performance signals to one or many computing service devices 430 included in the computing system 400. One or many first devices of the storage service device(s) 420 can embody the target brand repository 110. One or many second device of the storage service device(s) 420 can embody the brand performance repository 120.

The computing system 400 also can generate a ML model using target data and performance signals for target brands defined by the target data. As is explained above, generating the ML model can include training the ML model using the target brands as a training set and the performance signals as feature inputs. To that end, the computing system 400 can include one or many computing service devices 430. At least one of the computing service device(s) 430 can be functionally coupled to storage service device(s) 420. The coupling can be direct or can be mediated by the interface device(s) 410.

In addition, the computing service device(s) 430 can include the constructor unit 130. The constructor unit 130 can operate in accordance with functionality described herein. As such, the constructor unit 130 can access the target data from the target repository 110, and also can access the performance signals for the target brands from the brand performance repository 120. The constructor unit 120 can then train the ML model. At least one of the storage service device(s) 420 can embody the model repository 140.

The computing service device(s) 430 also can generate multiple quality scores using the trained ML model. Accordingly, the computing service device(s) 430 can include the assessor unit 150. The constructor unit 130 can operate in accordance with functionality described herein. Thus, the assessor unit 150 can receive, for example, performance signals for a group of brands for which a quality assessment is to be made. For instance, the group of brands can correspond to a catalog of a digital marketplace in a particular geographic region. The assessor unit 150 can then generate respective quality scores for the group of brands by applying the trained ML model (e.g., mode 134) to those performance signals. The assessor unit 150 can send the generated quality scores to the one or many storage service devices 420. At least one of the storage service device(s) 420 can embody the score repository 160.

Although not shown in FIG. 4, service devices 170 can be functionally coupled to the interface device(s) 410 to access data retained in the score repository 160. The storage service device(s) 420 also can include data and metadata that permits implementing the functionality described herein in generation of quality scores for brand curation.

Figure 5:
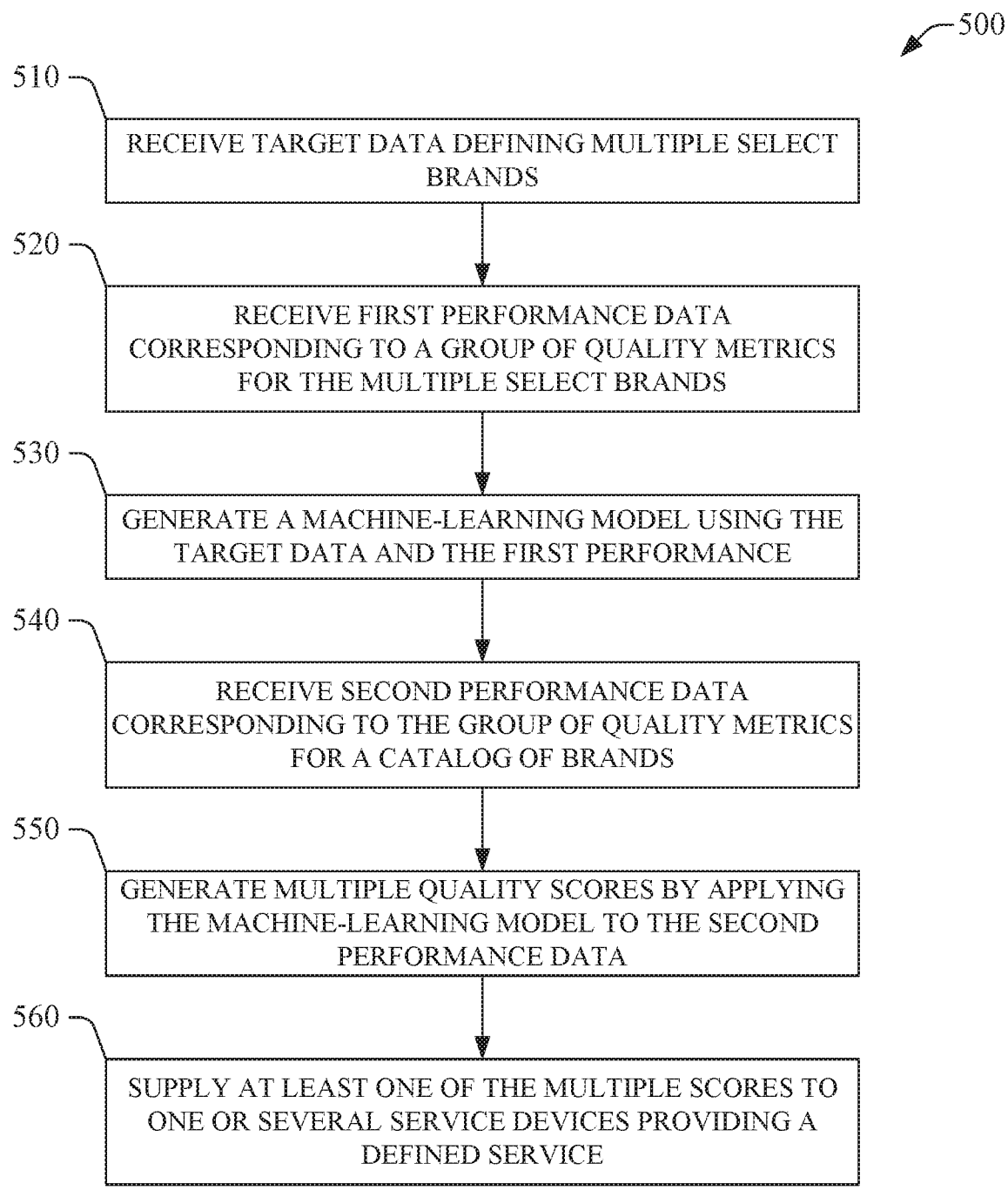
FIG. 5 illustrates an example of a method for generating quality scores for brand curation, in accordance with one or more embodiments of this disclosure.
Figure 6:
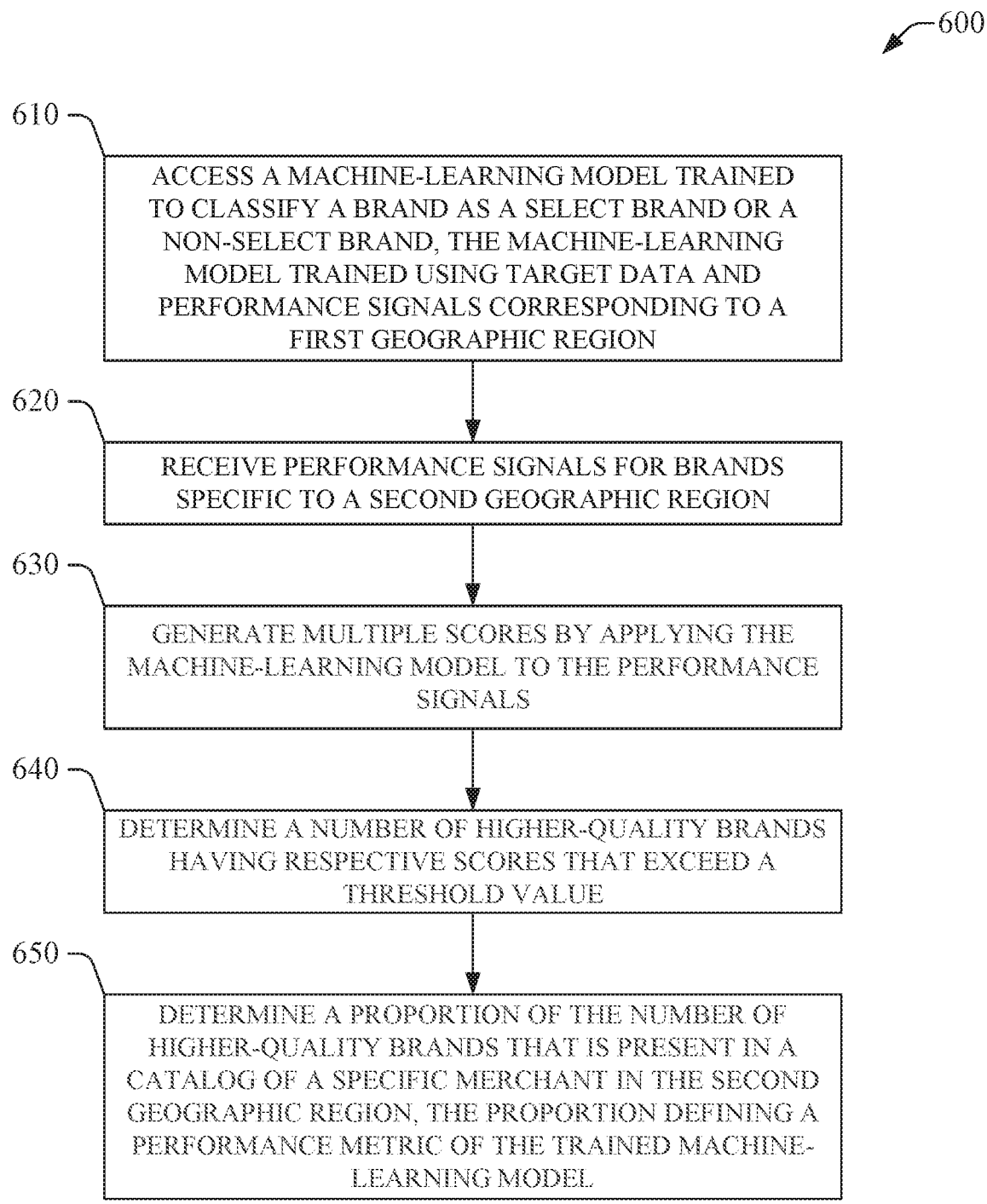
FIG. 6 illustrates an example of a method 600 for evaluating performance of a trained machine-learning model to generate quality scores for brand curation, in accordance with one or more embodiments of this disclosure.

In view of the functionality of the technologies disclosed herein, example methods that can be implemented in accordance with this disclosure can be more readily appreciated with reference to the flowcharts in FIG. 5 and FIG. 6. For purposes of simplicity of explanation, the example methods disclosed herein are presented and described as a series of blocks (with each block representing an action or an operation in a method, for example). However, it is to be understood that the disclosed methods are not limited by the order of blocks and associated actions or operations, as some blocks may occur in different orders and/or concurrently with other blocks from that are shown and described herein. For example, the various techniques of this disclosure can be alternatively represented as a series of interrelated states or events, such as in a state diagram. Further, not all illustrated blocks, and associated operations(s), may be required to implement a method in accordance with aspects of this disclosure. Further yet, two or more of the disclosed methods can be implemented in combination with each other, to accomplish one or more functionalities and/or advantages of the technologies disclosed herein.

It is noted that the methods of this disclosure can be retained on an article of manufacture, or computer-readable non-transitory storage medium, to permit or facilitate transporting and transferring such methods to a computing device (e.g., a desktop computer; a mobile computer, such as an electronic book reader (e-reader) or other tablets, or a smartphone; a gaming console, a mobile telephone; a blade computer; a programmable logic controller, and the like) for execution, and thus implementation, by a processor of the computing device or for storage in a memory thereof or functionally coupled thereto. One or more processors, such as processor(s) that implement (e.g., execute) one or more of the disclosed methods, can be employed to execute code instructions retained in a memory device, or any computer-readable or machine-readable medium, to implement the one or more methods. The code instructions can provide a computer-executable or machine-executable framework to implement the methods described herein.

FIG. 5 illustrates an example of a method 500 for generating quality scores for brand curation, in accordance with one or more embodiments of this disclosure. The example method 500 can be implemented, entirely or partially, by a computing system having various computing resources. The computing system has at least one processor and/or is functionally coupled to at least one processor that can implement (e.g., compile, execute, compile and execute, etc.) one or more blocks of the example method 500. The computing system also can include one or many memory devices, other types of computing resources, or a combination thereof. Such processor(s), memory device(s), and computing resource(s), individually or in a particular combination, can permit the computing system to implement the example method 500, entirely or partially. The computing resources can include operating system(s); software for configuration and/or control of a virtualized environment; firmware; CPU(s); GPU(s); TPU(s); virtual memory; disk space; interface(s) (I/O interface devices, programming interface(s) (such as APIs, etc.); controller devices(s); a combination of the foregoing; or similar. The computing resources available to the computing system also can include downstream communication bandwidth and/or upstream communication bandwidth.

In some scenarios, one or more blocks of the example method 500 can be implemented in a distributed fashion by two or more computing devices contained in the computing system. Each one of the two or more computing devices can have at least one processor or can be functionally coupled to at least one processor, where such processor(s) can implement at least one of the one or more blocks. The computing device(s) also can include memory device(s) and/or other computing resources. Regardless of the example method 500 being implemented by a distributed or non-distributed computing system, the at least one processor can be functionally coupled to at least one memory device or other types of computer-readable non-transitory storage media.

At block 510, the computing system can receive target data identifying multiple select brands. The multiple select brands are deemed high-quality brands and can serve as curated brands relative to other brands for which a quality assessment has yet to be made. In some embodiments, the multiple select brands can be identified by expert curators. Thus, each one of the multiple select brands can be an expert curated brand. In other embodiments, the multiple select brands correspond to brands of respective products carried by a specific merchant.

In yet other embodiments, the multiple select brands are identified by means of crowdsourcing. For example, those brands can be identified in social media accounts within a single social media platform or across multiple social media platforms. Social media posts that include a particular hashtag, e.g., #founditonamazon, can be identified, and brands corresponding to a product referred to in the social media posts also can be determined. As mentioned, other social media posts not including particular hashtags also can be utilized to determine brands. Brand data identifying brands determined from social media posts can be analyzed to select a group of brands that satisfy one or several selection criteria. Such a selection can result in second brand data identifying a group of brands that can be deemed high-quality brands.

At block 520, the computing system can receive first performance data corresponding to a group of quality metrics for the multiple select brands. The group of quality metrics can include, for example, a particular combination of branded impression factor, return ratio, repeat customer ratio, brand preference scores, revenue per glance view, brand review rating, brand review rating weighted by revenue, or brand registration indicator. As mentioned, in some embodiments, such a combination may not include metrics representing sale amounts or sale revenues by brand, or similar.

At block 530, the computing system can generate a machine-learning model using the target data and the performance data. Generating the machine-learning model can include training the machine-learning model to determine a probability that a particular brand is a high-quality brand. The generated machine-learning model that maps the first performance data to the multiple specific brands.

At block 540, the computing system can receive second performance data corresponding to the group of quality metrics for a catalog of brands. At block 550, the computing system can generate multiple scores by applying the machine-learning model to the second performance data. In some embodiments, applying the machine-learning model can include accessing the machine-learning model by means of an API or another type of program code. Each one of the multiple scores corresponds to a respective brand in the catalog of brands, and represents a respective quality assessment for the respective brand. Each score of the multiple scores can be, in one configuration, a numerical value that represents the probability that a brand is a high-quality brand. See diagram 157 in FIG. 1.

In some embodiments, rather than receiving performance data for an entire catalog of brands, the computing system can receive performance data for one or several particular brands within the catalog of brands. The particular brand(s) can be specific to a customer or customer type. Accordingly, in one of those embodiments, the computing system can receive attribute data defining at least one customer attribute identifying a customer or customer type. The computing system can identify, using the at least one customer attribute, one or several brands in the catalog of brands. The computing system can then receive performance data corresponding to the group of quality metrics for the identified brand(s) and can generate respective scores by applying the machine-learning model to the performance data. Each one of the respective scores represents a respective quality assessment for a respective one of the identified brand(s).

At block 560, the computing system can supply at least one of the multiple scores to one or several service devices providing a defined service. Supplying the quality score(s) can include retaining the multiple quality scores in one or several storage devices (e.g., score repository 160) and configuring an interface to permit access to the retained multiple quality scores. In some embodiments, supplying at least one quality score can include sending the quality score to the service platform device.

FIG. 6 illustrates an example of a method 600 for evaluating performance of a trained machine-learning model to generate quality scores for brand curation, in accordance with one or more embodiments of this disclosure. The example method 600 can be implemented, entirely or partially, by a computing system having various computing resources. The computing system that implements the example method 500 also can implement (e.g., compile, execute, compile and execute, etc.) one or more blocks of the example method 600.

In some scenarios, one or more blocks of the example method 600 can be implemented in a distributed fashion by two or more computing devices contained in the computing system. Each one of the two or more computing devices can have at least one processor or can be functionally coupled to at least one processor, where such processor(s) can implement at least one of the one or more blocks. The computing device(s) also can include memory device(s) and/or other computing resources. Regardless of the example method 600 being implemented by a distributed or non-distributed computing system, the at least one processor can be functionally coupled to at least one memory device or other types of computer-readable non-transitory storage media.

At block 610, the computing system can access a machine-learning model trained to classify a brand as a select brand or a non-select brand. The machine-learning model can be trained using target data and performance signals corresponding to a first geographic region. For example, the target data can define select brands present in the first geographic region, but absent in a second geographic region. The performance signals define transaction performance metrics for the select brands within a digital marketplace in the first geographic region.

At block 620, the computing system can receive performance signals for brands specific to the second geographic region. The performance signals include performance data for those brands, and define the quality metrics utilized during training.

At block 630, the computing system can generate multiple scores by applying the trained machine-learning model to the received performance signals. Each one of the multiple scores represents a quality assessment of a respective brand in a catalog of brands. At block 640, the computing system can determine a number of higher-quality brands having respective\ scores that exceed a defined threshold value.

At block 650, the computing system can determine a proportion of the number of higher-quality brands that is present in a catalog of a specific merchant in the second geographic region. As mentioned, such a proportion represents the portability of the trained machine-learning model. The proportion defines a performance metric of the trained machine-learning model.

Figure 7:
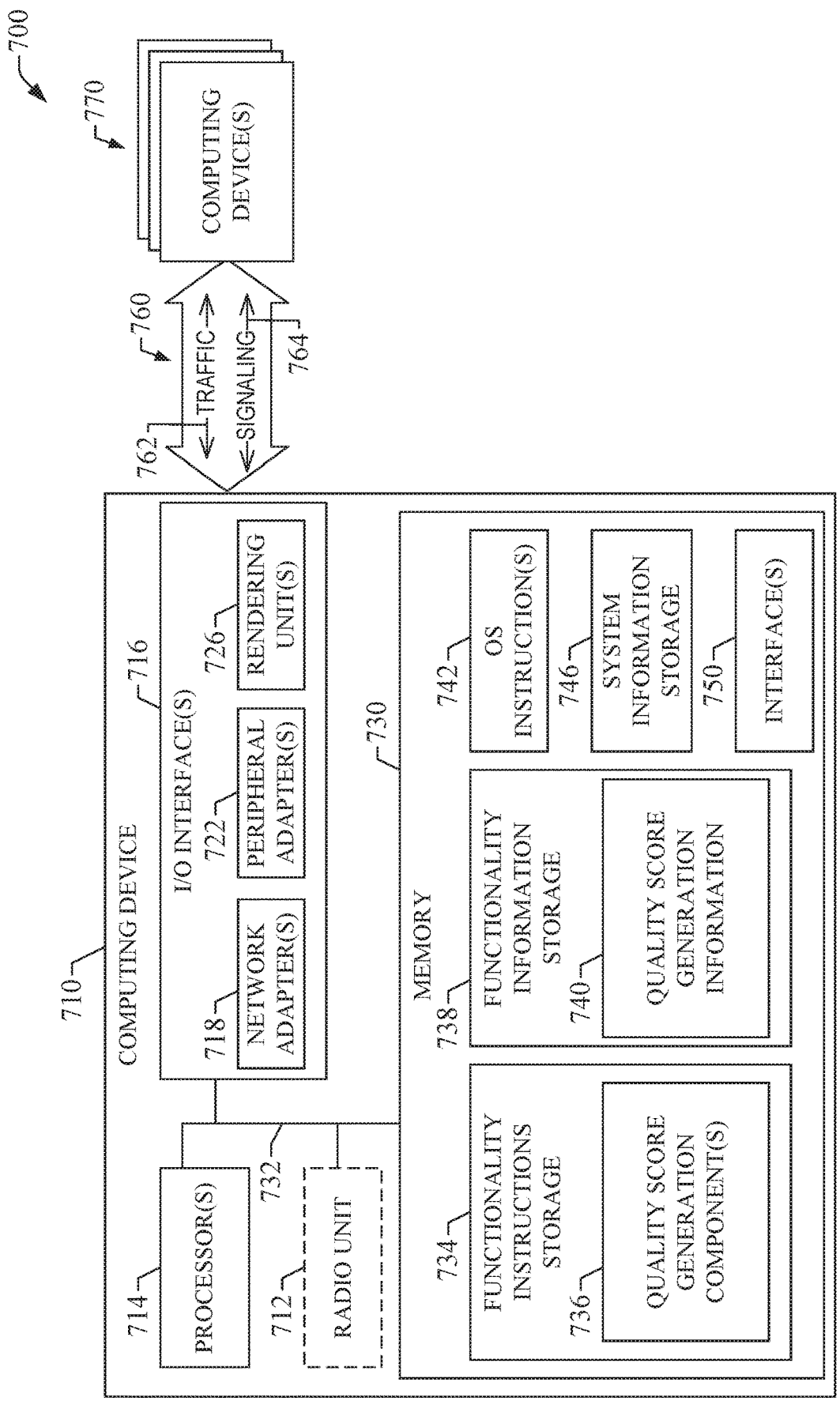
FIG. 7 illustrates an example of a computational environment for generation of quality scores for brand curation, in accordance with one or more embodiments of the disclosure.

FIG. 7 illustrates a block diagram of an example computational environment 700 for generation of quality scores for brands, in accordance with one or more aspects of the disclosure. The example computational environment 700 is merely illustrative and is not intended to suggest or otherwise convey any limitation as to the scope of use or functionality of the computational environment's architecture. In addition, the illustrative computational environment depicted in FIG. 7 should not be interpreted as having any dependency or requirement relating to any one or combination of components illustrated in the example operational environments of the disclosure. The example computational environment 700 or portions thereof can embody, or can include, for example, one or more of the operational environment 100 or the computing system 400.

The computational environment 700 represents an example implementation of the various aspects or features of the disclosure in which the processing or execution of operations described in connection with the generation of quality scores for brands disclosed herein can be performed in response to execution of one or more software components at the computing device 710. It should be appreciated that the one or more software components can render the computing device 710, or any other computing device that contains such components, a particular machine for generation of quality scores for brands as described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods disclosed herein, such as the example methods presented in FIG. 5 and FIG. 6.

For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 710 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 710 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the generation of quality scores for brand curation described herein can include personal computers; server computers; laptop devices; handheld computing devices; and multiprocessor systems. Additional examples can include set-top boxes, programmable consumer electronics, network personal computers (PCs), minicomputers, mainframe computers, blade computers, programmable logic controllers, distributed computing environments that include any of the above systems or devices, and the like.

As illustrated, the computing device 710 can comprise one or more processors 714, one or more input/output (I/O) interfaces 716, a memory 730, and a bus architecture 732 (also termed bus 732) that functionally couples various functional elements of the computing device 710. In certain embodiments, the computing device 710 can include, optionally, a radio unit 712. The radio unit 712 can include one or more antennas and a communication processing unit that can permit wireless communication between the computing device 710 and another device, such as one of the computing device(s) 770. The bus 732 can include at least one of a system bus, a memory bus, an address bus, or a message bus, and can permit exchange of information (data, metadata, and/or signaling) between the processor(s) 714, the I/O interface(s) 716, and/or the memory 730, or respective functional elements therein. In certain scenarios, the bus 732 in conjunction with one or more internal programming interfaces 750 (also referred to as interface(s) 750) can permit such exchange of information. In scenarios in which processor(s) 714 include multiple processors, the computing device 710 can utilize parallel computing.

The I/O interface(s) 716 can permit communication of information between the computing device and an external device, such as another computing device, e.g., a network element or an end-user device. Such communication can include direct communication or indirect communication, such as exchange of information between the computing device 710 and the external device via a network or elements thereof. As illustrated, the I/O interface(s) 716 can comprise one or more of network adapter(s) 718, peripheral adapter(s) 722, and rendering unit(s) 726. Such adapter(s) can permit or facilitate connectivity between the external device and one or more of the processor(s) 714 or the memory 730. For example, the peripheral adapter(s) 722 can include a group of ports, which can include at least one of parallel ports, serial ports, Ethernet ports, V.35 ports, or X.21 ports. In certain embodiments, the parallel ports can comprise General Purpose Interface Bus (GPM), IEEE-1284, while the serial ports can include Recommended Standard (RS)-232, V.11, Universal Serial Bus (USB), FireWire or IEEE-1394.

In one aspect, at least one of the network adapter(s) 718 can functionally couple the computing device 710 to one or more computing devices 770 via one or more traffic and signaling pipes 760 that can permit or facilitate exchange of traffic 762 and signaling 764 between the computing device 710 and the one or more computing devices 770. Such network coupling provided at least in part by the at least one of the network adapter(s) 718 can be implemented in a wired environment, a wireless environment, or both. The information that is communicated by the at least one of the network adapter(s) 718 can result from the implementation of one or more operations of a method in accordance with aspects of this disclosure. Such output can be any form of visual representation, including, but not limited to, textual, graphical, animation, audio, tactile, and the like. In certain scenarios, each of the computing device(s) 770 can have substantially the same architecture as the computing device 710. In addition or in the alternative, the rendering unit(s) 726 can include functional elements (e.g., lights, such as light-emitting diodes; a display, such as a liquid crystal display (LCD), a plasma monitor, a light emitting diode (LED) monitor, or an electrochromic monitor; combinations thereof; or the like) that can permit control of the operation of the computing device 710, or can permit conveying or revealing the operational conditions of the computing device 710.

In one aspect, the bus 732 represents one or more of several possible types of bus structures, including a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card International Association (PCMCIA) bus, a Universal Serial Bus (USB), and the like. The bus 732, and all buses described herein can be implemented over a wired or wireless network connection and each of the subsystems, including the processor(s) 714, the memory 730 and memory elements therein, and the I/O interface(s) 716 can be contained within one or more remote computing devices 770 at physically separate locations, connected through buses of this form, in effect implementing a fully distributed system. In certain embodiments, such a distributed system can implement the functionality described herein in a client-host or client-server configuration in which the quality score generation component(s) 736 or the quality score generation information 740, or both, can be distributed between the computing device 710 and at least one of the computing device(s) 770, and the computing device 710 and at least one of the computing device(s) 770 can execute such components and/or leverage such information.

The computing device 710 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 710, and can comprise, for example, both volatile and non-volatile media, and removable and/or non-removable media. In one aspect, the memory 730 can comprise computer-readable media in the form of volatile memory, such as random access memory (RAM), and/or non-volatile memory, such as read-only memory (ROM).

The memory 730 can comprise functionality instructions storage 734 and functionality information storage 738. The functionality instructions storage 734 can comprise computer-accessible instructions that, in response to execution (by at least one of the processor(s) 714), can implement one or more of the functionalities of the disclosure. The computer-accessible instructions can embody or can comprise one or more software components illustrated as quality score generation component(s) 736. In one scenario, execution of at least one component of the quality score generation component(s) 736 can implement one or more of the methods described herein, such as the example method 500 or the example method 600, or both. For instance, such execution can cause a processor (e.g., one of the processor(s) 714) that executes the at least one component to carry out one or a combination of the disclosed example methods. It should be appreciated that, in one aspect, a processor of the processor(s) 714 that executes at least one of the quality score generation component(s) 736 can retrieve information from or retain information in one or more memory elements 740 in the functionality information storage 738 in order to operate in accordance with the functionality programmed or otherwise configured by the quality score generation component(s) 736. The one or more memory elements 740 may be referred to as quality score generation information 740. Such information can include at least one of code instructions, information structures, or the like. For instance, at least a portion of such information structures can be indicative of a mapping or categorization of communication session and virtual locations; access rules; and/or preferences for promotional content.

In some embodiments, one or more components of the quality score generation component(s) 736 can embody, or can be part of, at least one of the constructor unit 130 or the assessor unit 150. As such, the one or more components can operate in accordance with, and can provide the functionality of, the constructor unit 130 or the assessor unit 150, or both, in accordance with aspects described in this disclosure. In other embodiments, one or more of the quality score generation component(s) 736 in combination with at least one of the processor(s) 714 can embody, or can be part of, at least one of the constructor unit 130 or the assessor unit 150, and can operate in accordance with, and can provide the functionality of, such units in accordance with aspects described in this disclosure.

At least one of the one or more interfaces 750 (e.g., application programming interface(s)) can permit or facilitate communication of information between two or more components within the functionality instructions storage 734. The information that is communicated by the at least one interface can result from implementation of one or more operations in a method of the disclosure. In certain embodiments, one or more of the functionality instructions storage 734 and the functionality information storage 738 can be embodied in or can comprise removable/non-removable, and/or volatile/non-volatile computer storage media.

At least a portion of at least one of quality score generation component(s) 736 or quality score generation information 740 can program or otherwise configure one or more of the processors 714 to operate at least in accordance with the functionality described herein. One or more of the processor(s) 714 can execute at least one of the quality score generation component(s) 736 and leverage at least a portion of the information in the functionality information storage 738 in order to provide generation of quality scores for brand curation in accordance with one or more aspects described herein.

It should be appreciated that, in certain scenarios, the functionality instruction(s) storage 734 can embody or can comprise a computer-readable non-transitory storage medium having computer-accessible instructions that, in response to execution, cause at least one processor (e.g., one or more of the processor(s) 714) to perform a group of operations comprising the operations or blocks described in connection with the disclosed methods.

In addition, the memory 730 can comprise computer-accessible instructions and information (e.g., data, metadata, and/or programming code instructions) that permit or facilitate the operation and/or administration (e.g., upgrades, software installation, any other configuration, or the like) of the computing device 710. Accordingly, as illustrated, the memory 730 can comprise a memory element 742 (labeled operating system (OS) instruction(s) 742) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 710 can dictate a suitable OS. The memory 730 also comprises system information storage 746 having data, metadata, and/or programming code that permits or facilitates the operation and/or administration of the computing device 710. Elements of the OS instruction(s) 742 and the system information storage 746 can be accessible or can be operated on by at least one of the processor(s) 714.

It should be recognized that while the functionality instructions storage 734 and other executable program components, such as the OS instruction(s) 742, are illustrated herein as discrete blocks, such software components can reside at various times in different memory components of the computing device 710, and can be executed by at least one of the processor(s) 714. In certain scenarios, an implementation of the quality score generation component(s) 736 can be retained on or transmitted across some form of computer-readable media.

The computing device 710 and/or one of the computing device(s) 770 can include a power supply (not shown), which can power up components or functional elements within such devices. The power supply can be a rechargeable power supply, e.g., a rechargeable battery, and it can include one or more transformers to achieve a power level suitable for the operation of the computing device 710 and/or one of the computing device(s) 770, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 718) to connect operationally to the conventional power grid. In another aspect, the power supply can include an energy conversion component, such as a solar panel, to provide additional or alternative power resources or autonomy for the computing device 710 and/or one of the computing device(s) 770.

The computing device 710 can operate in a networked environment by utilizing connections to one or more remote computing devices 770. As an illustration, a remote computing device can be a personal computer, a portable computer, a server, a router, a network computer, a peer device or other common network node, and so on. As described herein, connections (physical and/or logical) between the computing device 710 and a computing device of the one or more remote computing devices 770 can be made via one or more traffic and signaling pipes 760, which can comprise wired link(s) and/or wireless link(s) and several network elements (such as routers or switches, concentrators, servers, and the like) that form a personal area network (PAN), a local area network (LAN), a metropolitan area network (MAN), a wide area network (WAN), and/or other networks (wireless or wired) having different footprints. Such networking environments can be configured in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 770) that are functionally coupled (e.g., communicatively linked or otherwise coupled) through a network having traffic and signaling pipes and related network elements. In a distributed computing environment, in one aspect, one or more software components (such as program modules) can be located in both a local computing device 710 and at least one remote computing device.

The disclosed operational environments (e.g., system(s), device(s), etc.) and methods may take the form of an entirely hardware embodiment, an entirely software embodiment, or an embodiment combining hardware and software features. Furthermore, the methods and systems may take the form of a computer program product on a computer-readable non-transitory storage medium having computer-accessible instructions (e.g., computer-readable and/or computer-executable instructions), such as computer software, embodied in the computer-readable non-transitory storage medium.

Any suitable computer non-transitory storage medium may be utilized to form the computer program product.

Embodiments of the operational environments and methods are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general-purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "platform," "interface," "unit," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "platform," "interface," "unit," "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. A processor can constitute a central processing unit (CPU), a graphics processing unit (GPU), or a tensor processing unit (TPU). Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise solid state drives, hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques for generation of quality scores for brand curation. It is, of course, not possible to describe every conceivable combination of elements and/or methods for purposes of describing the various features of this disclosure, but it can be recognize that many further combinations and permutations of the disclosed features are possible. Accordingly, it may be apparent that various modifications can be made to the disclosure without departing from the scope or spirit thereof. In addition, or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A method, comprising:

receiving, by a computing system comprising at least one processor, target data defining a list of expert curated products;

receiving, by a computing system, first performance data defining values of a group of quality metrics for each product in the list of expert curated products, the group of quality metrics including repeat customer ratio, product review rating, and product impression count;

training, by the computing system, a machine-learning classification model to classify a product of a first merchant as pertaining to the list of expert curated products, wherein the machine-learning classification model is trained based at least in part on the first performance data classified as being from the list of expert curated products;

receiving, by the computing system, second performance data defining values of the group of quality metrics for a catalog of products;

generating multiple quality scores by applying the trained machine-learning classification model to the second performance data, wherein a first quality score of the multiple quality scores represents a quality assessment of a first product in the catalog of products, the first quality score defining a probability of the first product being classified as expert curated, and wherein a second quality score of the multiple quality scores represents a quality assessment of a second product of the first merchant in the catalog of products, the second quality score identifying a probability of the second product being classified as expert curated;

classifying, by the computing system, based on the first quality score, the first product as expert curated relative to the catalog of products;

classifying, by the computer system, based on the second quality score, the second product as not expert curated relative to the catalog of products; and presenting, by the computer system, the first product relative to the catalog of products based on the classification of the first product as expert curated.

2. The method of claim 1, further comprising sending the multiple quality scores to a service platform device that generates a search ranking using, at least partially, the multiple quality scores.

3. The method of claim 1, wherein the list of expert curated products and the first performance data pertain to a specific product category, and wherein the trained machine-learning classification model is applicable to third performance data pertaining to the specific product category, the third performance data defining values of the group of quality metrics during a defined period of time for defined products in the catalog of products that pertain to the specific product category.

4. The method of claim 1, wherein the catalog of products corresponds to a first geographic region, the method further comprising evaluating performance of the trained machine-learning classification model by, receiving third performance data defining values of the group of quality metrics for products specific to a second geographic region;

generating multiple second quality scores by applying the trained machine-learning classification model to the third performance data;

identifying first quality scores of the multiple second quality scores that exceed a threshold value;

determining a number of products corresponding to the first quality scores; and determining a proportion of the number of products that is present in a catalog of a specific merchant in the second geographic region, the proportion defining a performance metric of the trained machine-learning classification model.

5. A method, comprising:

receiving, by a computing system comprising at least one processor, data defining multiple select products;

receiving, by the computing system, first values defining a group of quality metrics for a first product of the multiple select products and of a merchant in a digital marketplace;

receiving, by the computing system, second values defining the group of quality metrics for a second product of the multiple select products and of the merchant;

generating, by the computing system, using at least the first values, the second values, and the data defining the multiple select products, a machine-learning model to determine a first quality score representing a probability of the first product being high-quality;

training, by the computing system, the machine-learning model based at least in part on performance signals being classified as from a list of high-quality products comprising the multiple select products;

generating, by the computing system, using the trained machine learning model, the first quality score and a second quality score representing a quality assessment of the second product of the merchant, the second quality score identifying a probability of the second product as being high-quality;

determining, by the computing system, based on the quality score, that the first product is high-quality relative to the digital marketplace;

determining, by the computing system, based on the second quality score, that the second product in the digital marketplace is not high-quality relative to the digital marketplace; and presenting, by the computer system, the first product relative to the multiple select products based on the classification of the first product as high-quality.

6. The method of claim 5, wherein the multiple select products include at least one of a curated product brand, a brand of a product carried by a specific merchant outside the digital marketplace, or a product brand identified using digital content posted in an account of a social media platform.

7. The method of claim 5, wherein the machine-learning model is a classification model that generates the quality score, and wherein generating the machine-learning model further comprises training the classification model using at least the first values and the second values as inputs and the multiple select products as a training set.

8. The method of claim 5, further comprising:
generating a second quality score by applying the machine-learning model to the second values.

9. The method of claim 8, further comprising:
receiving, by the computing system, data defining at least one customer attribute; and
identifying, by the computing system, using the at least one customer attribute, the second product of the merchant in a catalog of products.

10. The method of claim 8, further comprising:
determining that the second quality score exceeds a defined threshold value; and
classifying the first product in a catalog of products as a select product.

11. The method of claim 8, further comprising supplying the quality score to a service platform device that generates a search ranking using the quality score.

12. The method of claim 5, wherein the multiple select products, the first values, and the second values pertain to a product category, the method further comprising applying the machine-learning model to third values defining the group of quality metrics for a brand that pertains to the product category.

13. The method of claim 5, wherein the digital marketplace corresponds to a first geographic region, the method further comprising evaluating, by the computing system, performance of the machine-learning model by,
receiving third values defining the group of quality metrics for products specific to a second geographic region;
generating multiple quality scores by applying the machine-learning model to the third values;
determining a number of higher-quality products using the multiple quality scores, a first higher-quality product having a first quality score that exceeds a threshold value; and
determining a proportion of the number of higher-quality products that is present in a catalog of a specific merchant in the second geographic region, the proportion defining a performance metric of the machine-learning model.

14. A computing system, comprising:
at least one processor; and
at least one memory device having computer-executable instructions stored thereon that, in response to execution by the at least one processor, cause the computing system at least to:
receive first values defining a group of quality metrics for a first product having a merchant in a catalog of products;
apply a machine-learning model to the first values to determine a first quality score representing a probability of the first product in a digital marketplace being high-quality;
train the machine-learning model based at least in part on performance signals being classified as from a list of high-quality products comprising multiple select products;
generate, using the trained machine learning model, the first quality score and a second quality score representing a quality assessment of a second product of the merchant, the second quality score identifying a probability of the second product as being high-quality;
determine, based on the first quality score, that the first product is high-quality relative to the catalog of products;
determine, based on the second quality score, that the second product is not high-quality relative to the catalog of products; and
present the first product relative to the catalog of products based on the classification of the first product as high-quality.

15. The computing system of claim 14, wherein the machine-learning model is a classification model that generates the quality score, the machine-learning model further trained using select products as a training set and second values defining the group of quality metrics for select products as feature inputs.

16. The computing system of claim 14, the at least one memory device having further computer-executable instructions stored thereon that, in response to execution by the at least one processor, cause the computing system at least to:
receive data defining at least one customer attribute identifying a customer type; and
identify, using the at least one customer attribute, the second product.

17. The computing system of claim 16, wherein execution of the further computer-executable instructions further causes the computing system to:
determine that the first quality score exceeds a defined threshold value; and
classify the first product in the catalog of products as a select brand.

18. The computing system of claim 16, wherein execution of the further computer-executable instructions further causes the computing system to supply the quality score to one or more service devices generating a search ranking using the quality score.

19. The computing system of claim 15, wherein the select products and the second values pertain to a product category, the at least one memory device having further computer-executable instructions stored thereon that, in response to execution by the at least one processor, cause the computing system at least to:
apply the machine-learning model to third values defining the group of quality metrics for a product brand that pertains to the product category.

20. The computing system of claim 14, wherein the digital marketplace corresponds to a first geographic region, the at least one memory device having further computer-executable instructions stored thereon that, in response to execution by the at least one processor, cause the computing system to evaluate performance of the machine-learning model by, receiving second values defining the group of quality metrics for products specific to a second geographic region;
    generating multiple quality scores by applying the machine-learning model to the second values;
    determining a number of higher-quality products using the multiple quality scores, a first higher-quality product of the higher-quality products having a first quality score that exceeds a threshold value; and
    determining a proportion of the number of higher-quality products that is present in a catalog of a specific merchant in the second geographic region, the proportion defining a performance metric of the machine-learning model.

* * * * *